United States Patent [19]

Fecteau et al.

[11] Patent Number: 5,561,778
[45] Date of Patent: Oct. 1, 1996

[54] SYSTEM FOR REPRESENTING DATA OBJECT IN CONCATENATED MULTIPLE VIRTUAL ADDRESS SPACES WITH COMBINED REQUESTS FOR SEGMENT MAPPING

[75] Inventors: Jean G. Fecteau, Toronto; Eugene Kligerman; Lubor Kollar, both of North York, all of Canada

[73] Assignee: International Business Machines Corporation, Armonk, N.Y.

[21] Appl. No.: 442,770

[22] Filed: May 17, 1995

Related U.S. Application Data

[62] Division of Ser. No. 975,245, Nov. 12, 1992, abandoned.

[30] Foreign Application Priority Data

Nov. 12, 1991 [CA] Canada ................................ 2055295

[51] Int. Cl.⁶ .................................................. G06F 12/08
[52] U.S. Cl. ..................... 395/419; 395/413; 395/416; 395/471; 395/483; 395/876; 395/600; 395/700
[58] Field of Search .................................. 395/418, 419, 395/416, 471, 483, 600, 700, 876, 413

[56] References Cited

U.S. PATENT DOCUMENTS

| | | | |
|---|---|---|---|
| 4,315,310 | 2/1982 | Bayliss et al. | 395/823 |
| 4,577,274 | 3/1986 | Ho et al. | 395/415 |
| 4,686,620 | 8/1987 | Ng | 395/600 |
| 5,301,288 | 4/1994 | Newman et al. | 395/412 |
| 5,317,731 | 5/1994 | Dias et al. | 395/600 |
| 5,410,700 | 4/1995 | Fecteau et al. | 395/700 |
| 5,428,759 | 6/1995 | Smith et al. | 395/403 |

*Primary Examiner*—Ken S. Kim
*Attorney, Agent, or Firm*—Sterne, Kessler, Goldstein & Fox P.L.L.C.

[57] ABSTRACT

Method and means are provided for simulating a contiguous data space within a computer memory, and for placing and accessing data objects of various sizes within the simulated contiguous data space. Multiple, sub-data spaces are concatenated in such a way that each page and each sub-data space in the contiguous data space are uniquely identified. Data objects are placed in the contiguous data space and at the first reference to a page of the data object, only the segment containing the referenced page in the contiguous data space is mapped to the database storage disk. Once a data space page is mapped, the operating system can read the page into memory without requesting a disk operation from the database manager. On modifying a page, if the database disk page location is changed, the contiguous data space page is remapped without changing the page address in the data space. Also, modified data pages are rewritten to the database storage disk in an ongoing manner set by the user, instead of at intervals set by the operating system.

4 Claims, 16 Drawing Sheets

| DATA SPACE NO. | | | PAGE NO. IN DATA SPACE | | | | |
|---|---|---|---|---|---|---|---|
| SEGMENT NUMBER | | | | | | | |
| 0000 | 0000 | 0000 | 0000 | 0000 | 0000 | 0000 | 0000 |

SYSTEM FOR REPRESENTING DATA OBJECT IN CONCATENATED MULTIPLE VIRTUAL ADDRESS SPACES WITH COMBINED REQUESTS FOR SEGMENT MAPPING

This application is a division of application Ser. No. 07/975,245, filed Nov. 12, 1992, abandoned.

BACKGROUND OF THE INVENTION

Computerized data processing systems rely on various types of storage spaces to process and store data. For example, "main storage" is program-addressable storage from which data is loaded directly into the registers of the central processing unit (CPU) for processing. "Auxiliary storage" is addressable storage other than main storage that accessed by means of input/output (I/O) channels, and includes direct access storage devices such as magnetic storage disks. "Expanded storage" is a high-speed, high-volume electronic extension of main storage that is accessed synchronously in multiple-byte increments, e.g., 4096 (4K) bytes, sometimes referred to as a "page".

Data on storage disks exists in sets of fixed length records accessible in pages. The size of a page varies depending on the system in use. On some systems, a page is 4096 (4K) bytes. Also, on some computers, e.g., virtual machines, the operating system keeps track of disk space in blocks of 256 pages called segments. This is necessary because the hardware requires that a control block be maintained for each segment for virtual address translation. When data is transferred from auxiliary storage to the CPU, pages of data are transferred to a storage buffer in segments.

In order for the CPU to process the data, the data normally should be in main storage. Main storage, however, is limited and is therefore not used to store large amounts of data permanently. On the other hand, vast amounts of data may be stored on data disks. However, accessing data from disks is slow compared to the rate at which it can be processed in main storage. To compensate for the difference in access rates, a data buffer is used. A data buffer is a portion of storage used to hold input and output data temporarily. The data buffer can reside in main storage or expanded storage.

On multi-user computing systems, concurrent users time-share the resources on the computer systems through "virtual machines". In a virtual machine, which is a functional simulation of the real machine, each user addresses the computer main storage as though it were real. Addressable main storage in a virtual machine is called "virtual storage". The size of virtual storage is limited by the addressing scheme of the computer system and by the amount of real disk storage available. Data in virtual storage is mapped to real addresses when the CPU references the data. Mapping establishes a correspondence between a physical location on disk and a virtual storage location. The operating system maintains an address translation table for this purpose.

On virtual machines, each user's reference to a memory address is referred to as a virtual address, and each range of addressable space available to a user is called an address space. When a user references a virtual storage location, the page containing that location may be on disk or expanded storage as indicated by a "flag" in the address translation table. When a page is to be copied to main storage, the operating system reads the page into an available real storage page location. When completed, the page translation table is updated to reflect the new page location. If no real storage space is available, the operating system frees up main storage space by "paging out" least recently used pages.

A typical database storage system comprises a directory disk, one or more data disks, and one or two log disks similar to the data disks. The directory disk contains information on the mapping of the database pages from virtual storage to their real physical location and other information describing the physical configuration of the data base. The data disks store data, while the log disks record transactions against the database.

In a database system, users are assigned logical pages on data disks to store data objects. A data object is a logical set of pages in the database. For example, in a relational database system, a data object may be viewed as a set of pages containing records of rows and columns of a table where each row is a separate record, and each column is a different data field. When a data object is created, entries are inserted in the database directory disk to indicate which data object pages contain data, and their physical location on a data disk. Initially, only directory space is taken, but as a user inserts data into a data object, pages are allocated on a data disk and the directory disk is updated to identify those pages.

In order to maintain data integrity, the database system takes "checkpoints" of the database at certain intervals to ensure that a consistent version of the database is saved. For example, when a database page is modified, a copy of the page as of the previous checkpoint is kept unchanged, the modified version of the page is copied to disk, and the page directory is updated to point to the new location. Hence, at checkpoint time, the modified version of the database becomes the current copy of the database.

On virtual machines, data space pages are mapped to disk by various techniques. For example, contiguous virtual storage pages can be mapped to contiguous disk pages. This is referred to as a physical mapping. Alternatively, contiguous virtual pages can be mapped to non-contiguous disk pages. This is referred to as a logical mapping.

On some types of virtual machines, users access multiple address spaces. Some of these address spaces, however, contain only data (not computer instructions) and are referred to as data spaces. Furthermore, data space pages can be mapped to a data disk in such a manner as to eliminate the need for the database program manager to execute page I/O operations in order to move data between a data disk and main storage. On these systems, the location of a data object page on a data disk is known to the operating system. When the page is referenced by a user, the operating system reads the page from its data disk location without requiring a specific disk operation from the database program manager. When a page is directly accessible by the operating system, the database system operates more efficiently with less demands on CPU processing cycles.

On database systems, there is a continuing need to improve the overall efficiency of the system to handle large amounts of data. In particular, there is a need for faster responses to queries and data changes, efficient use of real storage, and improved efficiency in handling data objects. This, in turn, directs a need for database systems that optimize the use of data spaces, map only those pages of a data object that are referenced rather than the whole data object, and minimize database downtime at checkpoints.

In the prior art, various schemes are available to use data spaces. However, a method or means has not been found that discloses a multi-user system using data spaces in virtual memory for handling data objects of various sizes. Examples of prior art involving virtual memory, but not addressing this deficiency, include the following U.S. patents:

U.S. Pat. No. 4,742,447 ("Method To Control I/O Accesses In Multi-tasking Virtual Memory Virtual Machine Type Data Processing System") discloses a method for accessing information in a page segmented virtual memory data processing system in which virtual machines running UNIX type operating systems are concurrently established, and in which a memory manager controls the transfer of information between primary storage and secondary storage devices in response to the occurrence of page faults.

U.S. Pat. No. 4,843,541 ("Logical Resource Partitioning of a Data Processing System") discloses a method and means for partitioning the resources in a data processing system into a plurality of logical partitions. The main storage, expanded storage, the channel and sub-channel resources of the system are assigned to the different logical partitions in the system to enable a plurality of preferred guest programming systems to run simultaneously in the different partitions.

U.S. Pat. No. 4,843,542 ("Virtual Memory Cache for Use in Multi Processing Systems") discloses a system for maintaining data consistency among distributed processors, each having an associated cache memory.

U.S. Pat. No. 4,922,415 ("Data Processing System for Converting Virtual to Real Addresses Without Requiring Instructions from the Central Processing") discloses a method in which a controller performs the translation functions for the inter-operability of the processor and memory and does so without requiring instructions from the processor.

U.S. Pat. No. 4,961,134 ("Method For Minimizing Locking and Reading in a Segmented Storage Space") discloses a page accessing method in a segmented table-space which eliminates unnecessary reading and locking. The table-space comprises data pages grouped into identical-size segments, each segment storing data for a single table. A status indicator for each data page of a segment is kept in a separate segment control block stored in a space map page.

Consequently, there is an unfulfilled need for a means to create and use data spaces to accommodate large data objects of different sizes, including data objects which may be much larger than the size of a single real data space.

Also there is an unfulfilled need for a means to make more efficient use of real storage by mapping to a data disk, only those data object pages from a data space that are referenced by the CPU, rather than mapping the entire data object.

Yet another unfulfilled need is a means to efficiently save modified pages from a data space to a data disk so as to reduce the database down-time at checkpoints.

A full understanding of how the present invention addresses the above unfulfilled needs may be had by referring to the following description and claims taken in conjunction with the accompanying drawings.

SUMMARY OF THE INVENTION

The present invention provides a method for simulating a contiguous addressable data space in a computer memory, which can be a virtual memory. Multiple addressable sub-data spaces are concatenated to simulate the contiguous addressable data space. The location of each concatenated sub-data space is kept track of within the contiguous addressable data space. Each sub-data space is identified by an assigned unique sub-data space identifier. Each sub-data space has a known number of pages and each page has a known number of addressable storage locations. Each page is assigned a unique page identifier within the contiguous addressable data space. Each addressable location within the contiguous addressable data space is referenced based on its unique page identifier and sub-data space identifier containing the page.

Another aspect of the invention includes a means or apparatus for simulating a contiguous addressable data space in a computer memory. One embodiment uses computer programs stored or carried on suitable storage media, such as magnetic or optical media. The program includes means for concatenating multiple addressable sub-data spaces to simulate a contiguous addressable data space and means for keeping track of the location of each concatenated sub-data space within the contiguous addressable data space. An identification portion of the program provides means for identifying each sub-data space by an assigned unique sub-data space identifier. Each page has a unique page identifier so that each addressable location within the contiguous addressable data space can be referenced by the unique page identifier and sub-data space identifier containing the page.

Another aspect of the invention provides a computer system with a simulated contiguous addressable data space in computer memory. Multiple addressable sub-data spaces simulating the contiguous addressable data space are concatenated using an index containing the location of the sub-data spaces. Each sub-data space is identified by a unique sub-data space identifier and has a predefined number of pages, wherein each page has a predefined number of addressable storage locations. The addressable storage locations are mappable to corresponding locations in another storage device. Each page is identified by a unique page identifier within the contiguous addressable data space and each addressable location within the contiguous addressable data space is capable of being referenced by means of a unique page identifier and the sub-data space identifier.

BEST MODE FOR CARRYING OUT THE INVENTION

Figure 1:
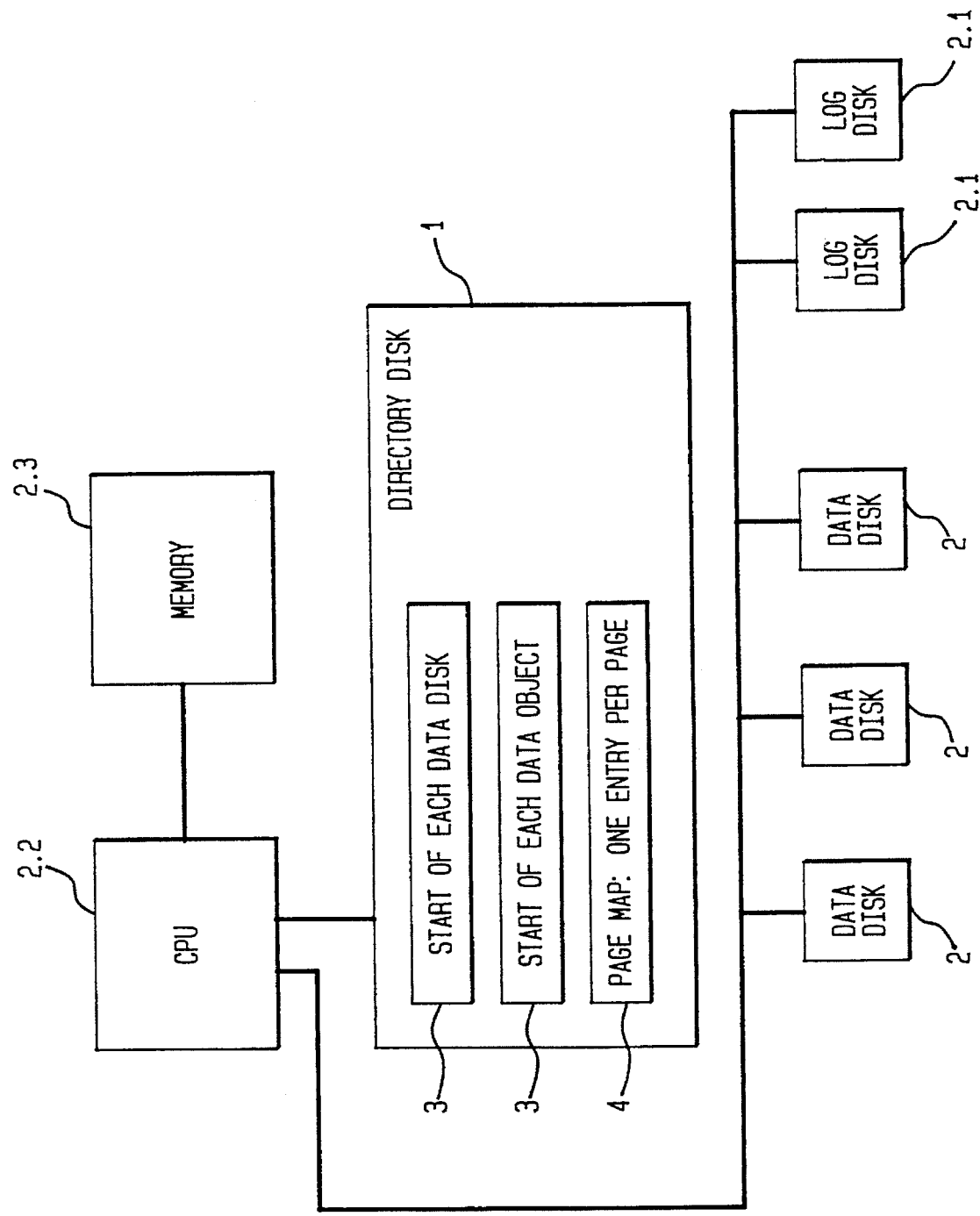
FIG. 1 shows key information maintained in a database directory relevant to the present invention.

The invention is implemented using the database storage system shown in FIG. 1. It comprises a directory disk 1, one or more data disks 2, and one or two log disks 2.1 similar to the data disks 2. The database storage system is part of a computer system having a central processing unit (CPU) 2.2 and memory 2.3. The CPU 2.2 runs a database management system (DBMS) software program which manages the data stored in the storage devices.

The directory disk 1 contains information on the mapping of the database pages from virtual storage to their real physical locations and other information describing the physical configuration of the database. The data disks 2 store data, while the log disks 2.1 record transactions against the database.

In a database system, users are assigned logical pages on a data disk 2 to store data objects. A data object is a logical set of pages in the database. For example, in a relational database system, a data object may be viewed as a set of pages containing records of rows and columns of a table where each row is a separate record, and each column is a different data field. As shown in FIG. 1, when a data object is created, entries are inserted in the directory disk 1 to indicate which data object pages contain data 3, and their physical location on a data disk 4.

Figure 2:
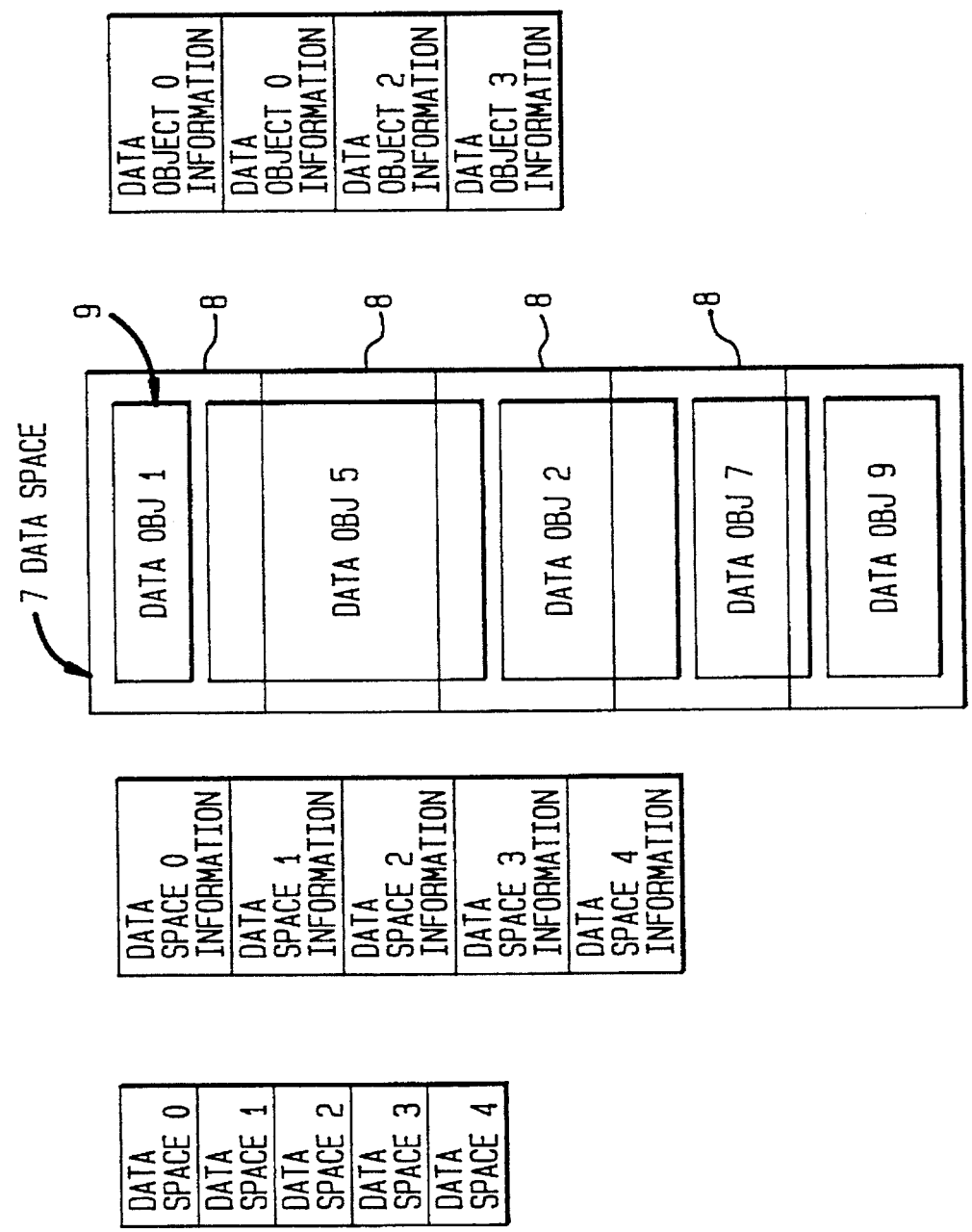
FIG. 2 shows an overall representation of the key elements in this invention.

The present invention incorporates the chosen embodiment of FIG. 2 into a database system as shown in FIG. 1. Therefore, the present invention is a database system that supports data objects and data space services. However, it is to be understood that the invention is not restricted to the specific system described, but can be applied on a computer system that supports data spaces, data objects and data disks in the manner described herein.

Figure 4:
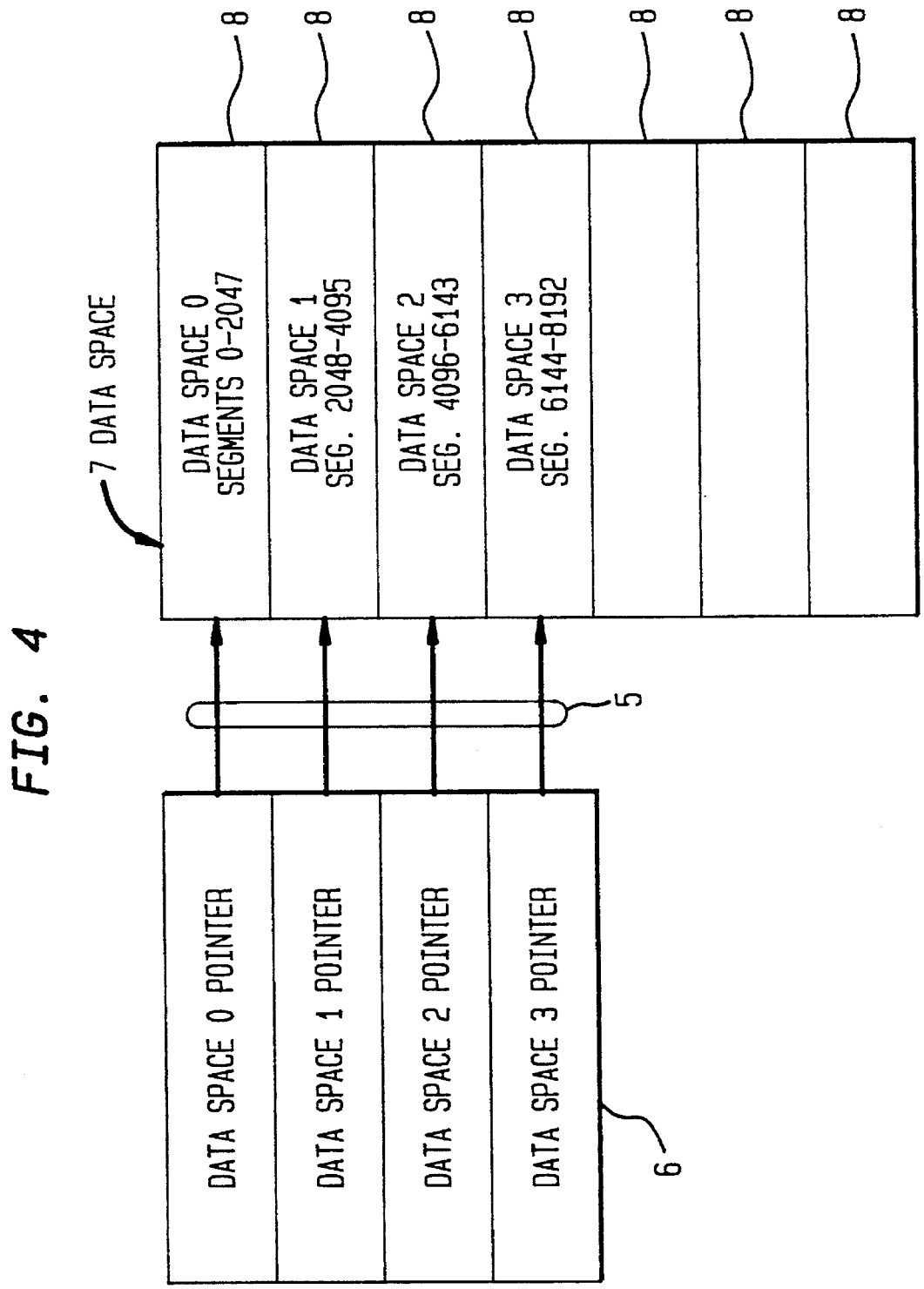
FIG. 4 shows data objects placed in specific data spaces using logical mapping.
Figure 6:
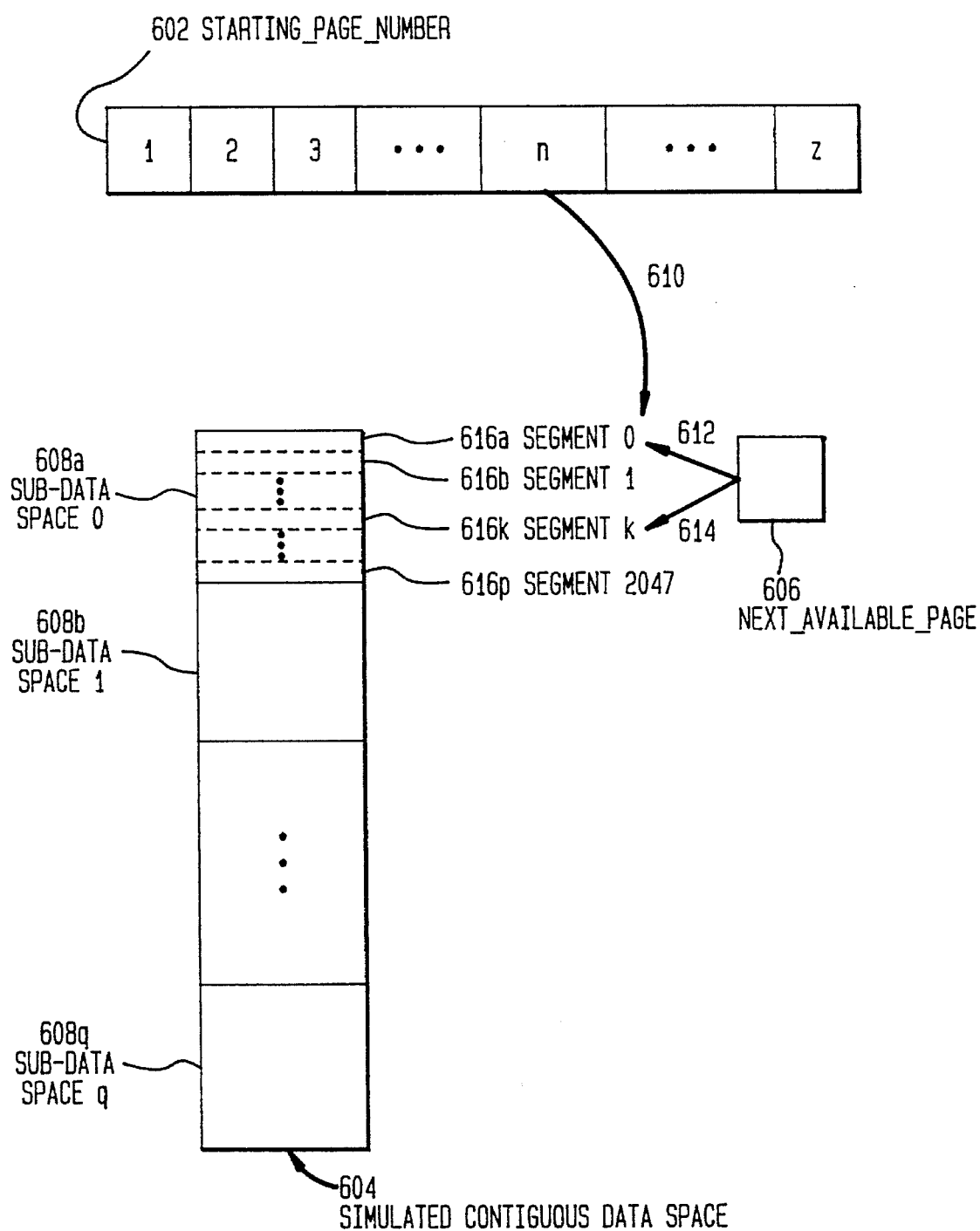
FIG. 6 is a block diagram illustrating the structure of a simulated contiguous data space.

The invention is summarized as comprising the following steps which are described in more detail in subsequent sections:

Step 1. As shown in FIGS. 4 and 6, on database initialization, the present invention provides for the creation, by the use of pointers 5 and a data space table 6, of a contiguous data space 7, 604 comprising linked, but separately identifiable, sub-data spaces 8, 608a–608q. Each data page within the contiguous area 604 is identifiable by an assigned page number. Each sub-data space 608a–608q within the contiguous data space 604 is identifiable by an assigned sub-data space identifier;

Step 2. On first reference to a data object in the database by a user, the invention reserves enough pages in the simulated contiguous data space 604 to place the entire data object starting from the first available "empty" page location. In the simulated contiguous data space 604, the pages to be reserved start from the first available free page, and the page number is incremented sequentially to match the size of the data object. The invention provides means to identify any page of the data object within the simulated contiguous data space 604 once the starting page number 602 of the data object is established and its size, expressed in pages, is known;

Step 3. On first reference by a user to a page in the data object within the contiguous area 604, the invention provides for a mapping to disk 2 only the segment 616a–616p of the data object containing the desired page. This partial mapping of the data object, rather than mapping the whole data object, minimizes the use of main storage 2.3 because for each segment 616a–616p mapped, the operating system maintains a control block that uses up main storage 2.3. Delaying the mapping to a segment 616a–616p on the first reference means that a control block is only allocated if the segment 616a–616p is actually referenced. Therefore, data space segments 616a–616p that are never referenced, and thus not mapped, will not require a control block; and Step 4. After pages have been modified, the invention saves the modified pages at predetermined time intervals set by the user, rather than waiting for the database system to make a global save at a checkpoint. This provision of the invention allows pages to be saved in an ongoing manner that minimizes the database down time associated with a system initiated checkpoint.

Details on the above steps are provide in the following sections.

Figures 3, 5:
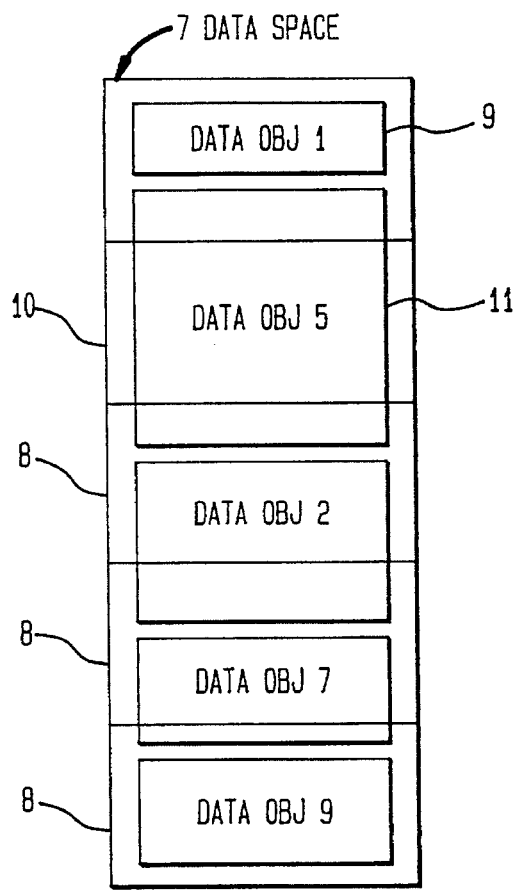
FIG. 3 shows how multiple independent sub-data spaces are made to appear contiguous by using a table of pointers.
FIG. 5 shows how a page address can be converted to a data space address and the relevant portion of the address used by this invention.

Since a data object can be larger than the maximum size of the real data space available to a user, the first step, as provided by this invention and shown in FIGS. 3, 4, and 6 is to create a large simulated contiguous data space 7, 604 by linking separately identifiable fixed-sized sub-data spaces 8, 608a–608q. This is accomplished by the following steps:

i) Logically link multiple fixed-sized sub-data spaces 608a–608q using an array of pointers 6, and maintain a data space table for this purpose.

ii) For each page in the simulated contiguous data space 604, assign a unique page number as provided for by this invention; and iii) For each page in the simulated contiguous data space 604, establish the page number as provided for by the present invention.

In order to keep track of the identity of each data object and sub-data space 608a–608q within the simulated contiguous data space 604, a table of pointers 6 is set up to identify the start and end of each data object and sub-data space 608a–608q. Within the simulated contiguous data space 604, any page number can be located as provided by the present invention. For example, if the size of each sub-data space 608a–608q is 524,288 pages, and the page being referenced is page number 1,217,436, then the referenced page is 168,860 in the third sub-data space 608a–608q. After the page has been identified, it is mapped to the correct real storage page.

In pseudocode format, the procedure to determine the page address as a function of its location in a data space 608a–608q is expressed as shown in Table 1.

In the pseudocode in Table 1, the Starting_page_number 602 is the location of the first page of the data object in the simulated contiguous data space 604. The symbol (/) represent an integer division. The symbol (//) represents the remainder of an integer division. The symbol (*) is the multiplication operator. The variable (n) is the identity of the data object. The variable (m) is the page number within the data object containing the required data.

Figure 7:
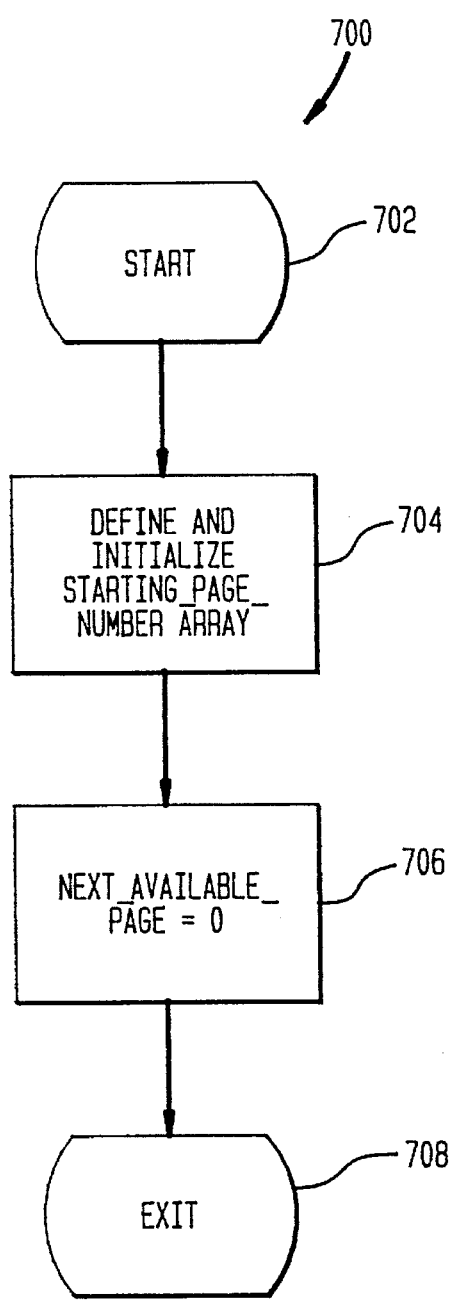
FIG. 7 is a control flow diagram illustrating the present invention at system initialization.
Figure 8:
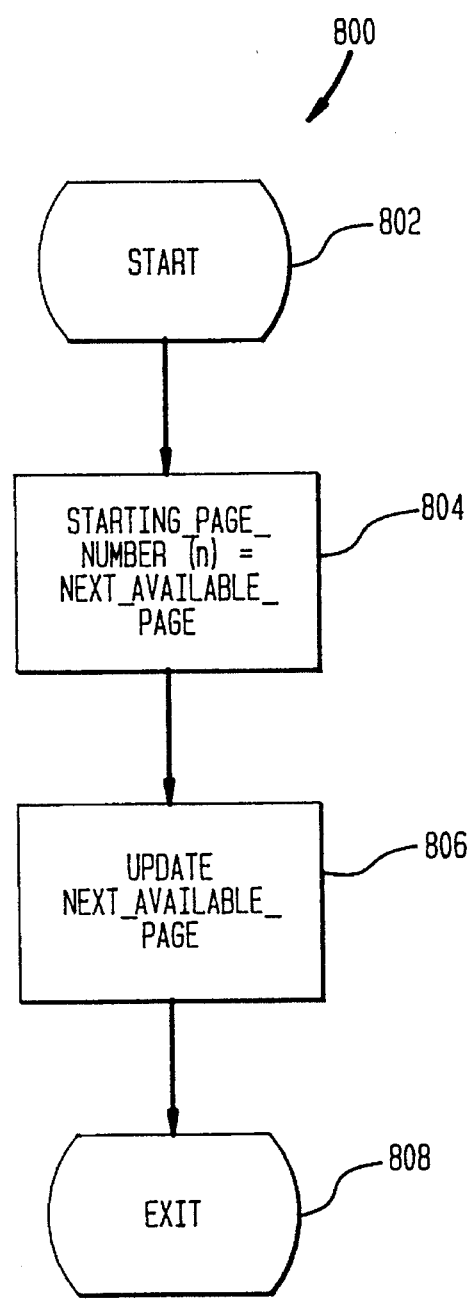
FIG. 8 is a control flow diagram illustrating how a data object is added to a simulated contiguous data space.
Figure 9:
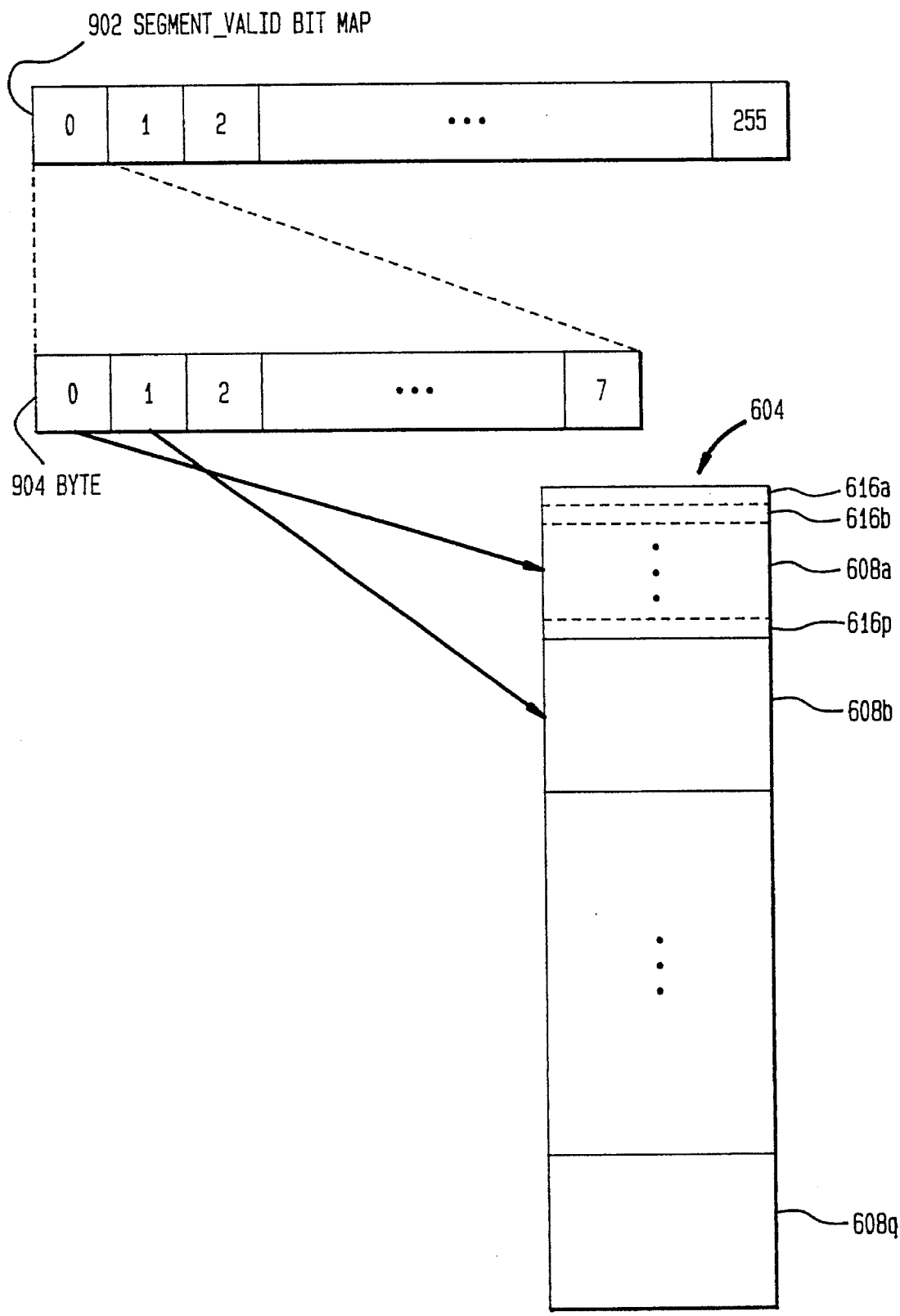
FIG. 9 is a block diagram illustrating the structure of a segment_valid bit map.

If the data object Starting_page_number 602 is not known, it is determined as follows:

i) On database initialization, an array named "Starting_page_number" 602 is defined to contain the starting page location of each data object to be placed in the simulated contiguous data space 604. The dimension of the array 602 is the same as the number of data objects in the database. The array 602 is initialized to negative values to indicate that the data objects have not yet been placed in the simulated contiguous data space 604. See step 704 in FIG. 7;

ii) A variable "Next_available_page" 606 is defined and initialized to 0 to indicate that this is the beginning page of the empty simulated contiguous data space 604. See step 706 in FIG. 7;

iii) At the first user reference to a data object, the next available set of pages in the simulated contiguous data space 604 is reserved for the referenced data object. The Starting_page_number 602 of the referenced data object is set 610 to the Next_available_page 606 counter. See step 804 in FIG. 8; and iv) The Next_available_page 606 counter is then increased by the size of the data object (in pages) rounded up to the next segment 616a–616p so as to start all data objects on a segment boundary 612, 614. See step 806 in FIG. 8. In this invention, it is convenient to start the data object on a new page segment 616a–616p boundary, but this is not an essential requirement if the system does not handle pages in segments.

With the above procedure, any address within the simulated contiguous data space 604 can be determined once the location of the object is known. Segments 616a–616p of the data object can then be mapped to disk 2 using information in the database directory 1.

The same result is obtained by shifting bits. For example, on a 32-bit computer architecture, bits 0 to 12 are used to represent the data space number, and bits 13 to 31 shifted left 12 positions (equivalent to multiplication by 4096) as the address in the data space. This alternative procedure is illustrated in FIG. 5.

Once the simulated contiguous data space 604 is created, a data object is placed in the contiguous data space 604 as shown in FIG. 3. For example, data object number 1 (9) consisting of 102,528 pages is placed in pages 0 to 102,527 in sub-data space 1 (10). This may be followed by another data object number 5 (11), consisting of 1,024,000 pages placed from pages 102,656 (which marks the beginning of a new segment in data space 1) to pages spanning sub-data spaces 2 (8) and 3 (8). In this example, data object 1 would therefore be placed in the first 400 segments of the simulated contiguous data space 604, while data object 5 would be placed from the first page of segment number 401 starting from page number 102,565.

Similarly, since the Starting_page_number 602 for each data object is known, any request for a data page can be converted to a page number within the simulated contiguous data space 604. For example, if data object (n) starts at page 1,126,656 and data page 90,780 is requested, the page number is 1,217,436 or page 168,860 located in the third sub-data space 608a–608q.

An important benefit in allowing a data object to start on a segment 616a–616p boundary instead of at the beginning of a data space 608a–608q is the ease in supporting both very large data objects (spanning more than one data space 608a–608q) and very small data objects (spanning much less than the size of one data space 608a–608q). This invention eliminates the need to have one contiguous data space 604 for each data object, and makes it possible to have many small and large data objects placed in the same simulated contiguous data space 604.

Once the data object is placed in the simulated contiguous data space 604, it can be mapped to the correct data disk 2 pages based on information contained in the database directory disk 1. However, mapping an entire data object at its first reference is expensive and requires considerable real storage. For this reason, this invention provides a mechanism to delay the mapping until a first reference of a data object, and then to map only the segment 616a–616p containing the desired pages of the data object by a procedure called "mapping on demand".

Mapping on demand is illustrated in FIGS. 9–12 and is described as follows: For each sub-data space 608a–608q, a segment-valid bit map 902 is created to indicate if each segment 616a–616p in a sub-data space 608a is currently "referenced". A segment 616a–616p is referenced if the pages containing data in that segment 616a–616p have been mapped to disk 2. Initially, the segment_valid bit map 902 is set to '0' and the entire sub-data space 608a–608q is considered not referenced. The bit is referred to as the "segment valid bit" and one segment_valid bit map 902 is used per data space 608a–608q. For example, if a sub-data space 608a–608q is made up of 524,288 pages and each segment 616a–616p is 256 pages, then there are 2048 segments 616-a–616p. Therefore, the segment_valid bit map 902 is 2048/8=256 bytes per sub-data space 608a–608q which is allocated when the sub-data space 608a–608q is created.

Figure 10:
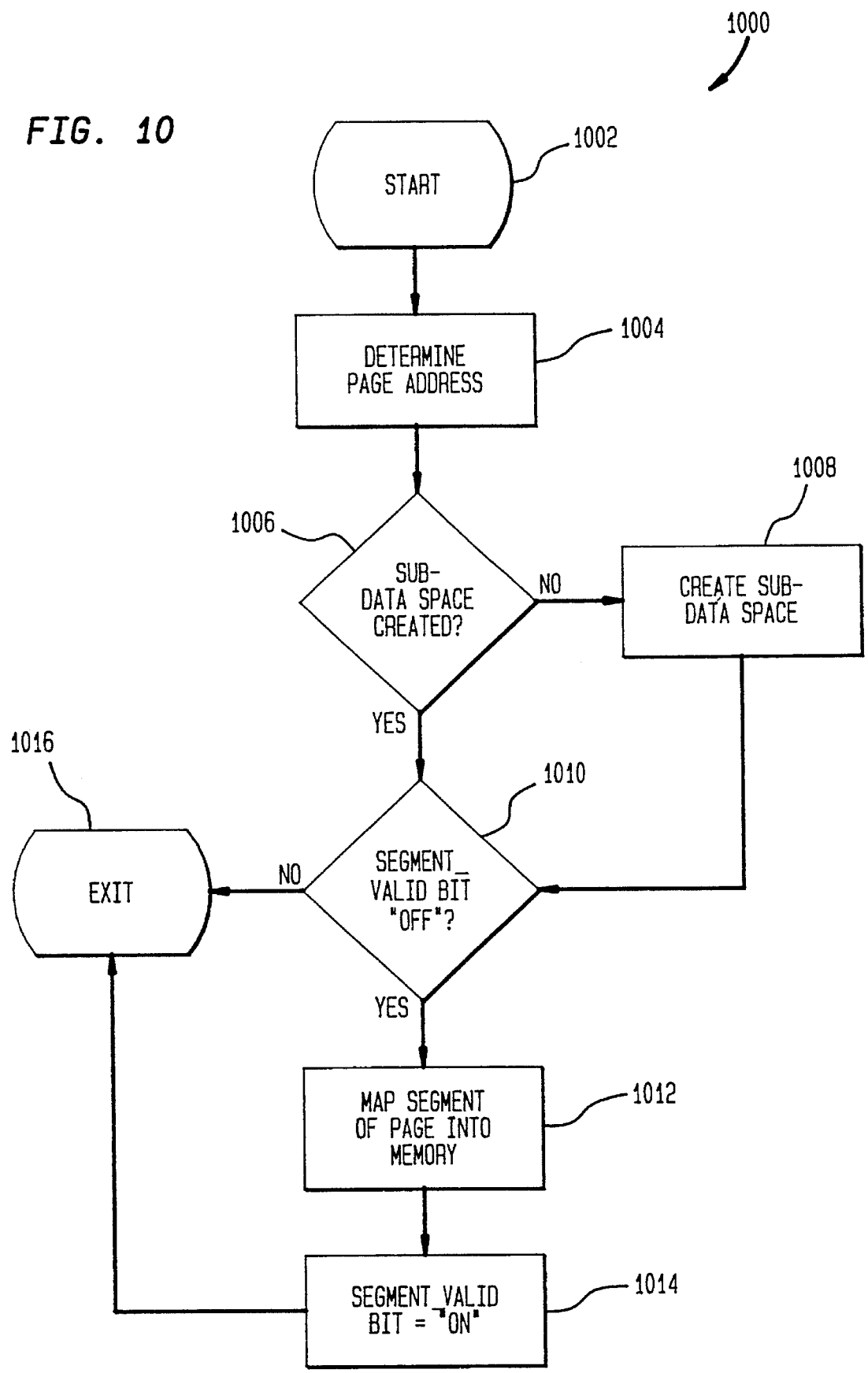
FIG. 10 is a control flow diagram illustrating mapping on demand.
Figure 11:
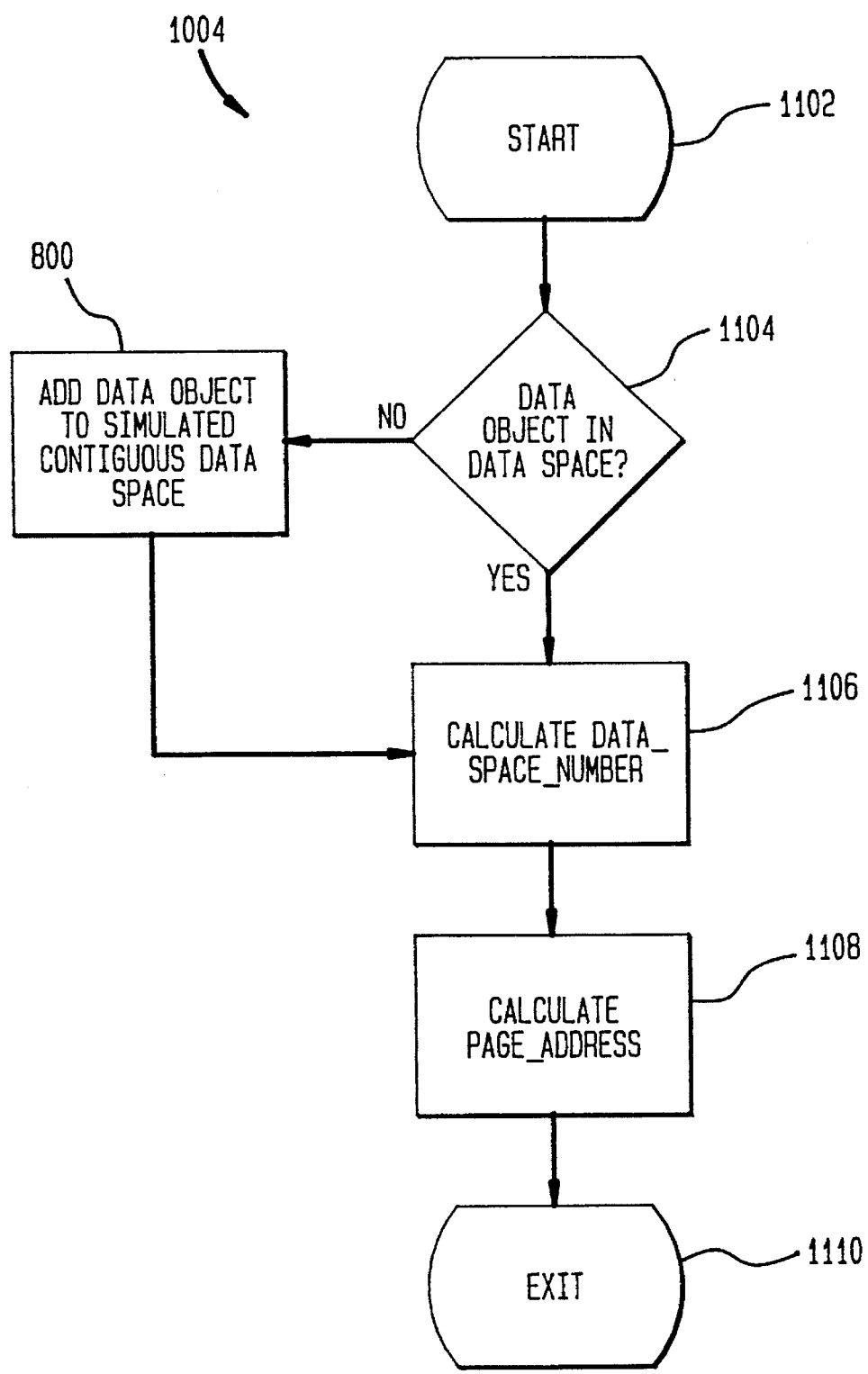
FIG. 11 is a control flow diagram illustrating how to calculate a page address in a simulated contiguous data space.
Figure 12:
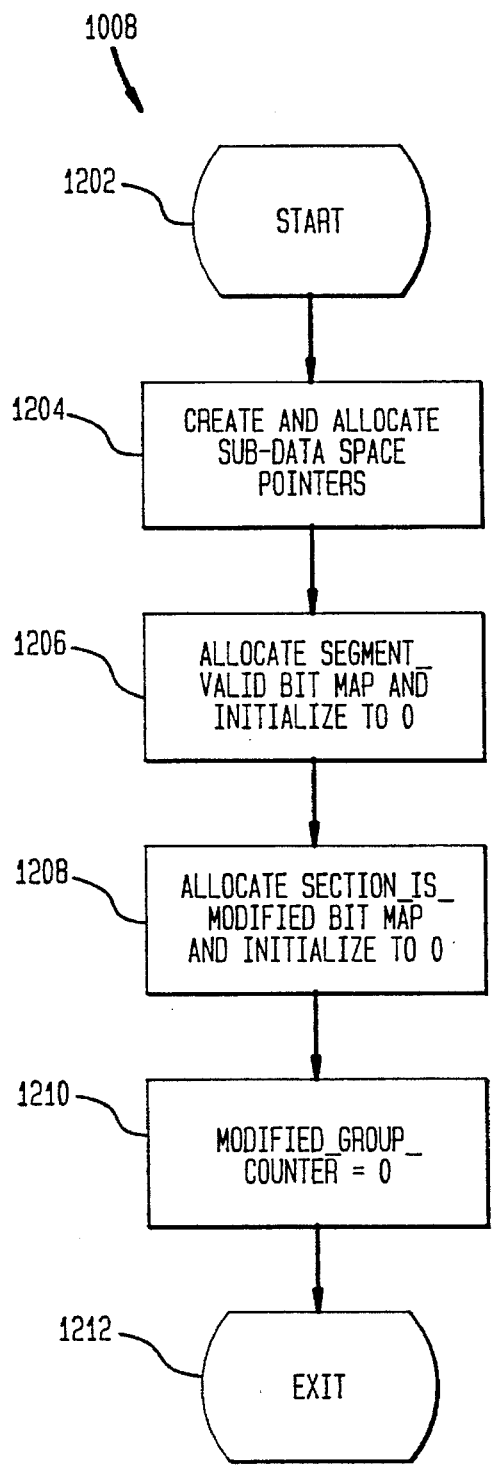
FIG. 12 is a control flow diagram illustrating the creation of a sub-data space in a simulated contiguous data space.

Although the entire data object is placed in the simulated contiguous data space 604 when it is first referenced, the sub-data spaces 608a–608q and the segment_valid bit maps 902 may not all exist. The mechanism provided by this invention to calculate the page address of any page in the contiguous data space 604 detects if this is the first reference to a sub-data space 608a–608q and/or a segment 616a–616p of the data object. If this is the first reference, a sub-data space 608a–608q is created and a segment 616a–616p is mapped. The steps comprising mapping on demand are illustrated in FIG. 10 and are summarized as follows:

Step 1. At first reference to a data object, it is placed in the simulated contiguous data space 604 by allocating the starting and ending data space 608a–608q address as previously described. See step 1004 in FIG. 10, steps 1104 and 800 in FIG. 11, and FIG. 8;

Step 2. Calculate the address of the referenced page as previously described. See steps 1106 and 1108 in FIG. 11, thereby returning to step 1004 in FIG. 10;

Step 3. If the sub-data space 608a–608q was not created as determined in step 1006, then proceed to step 1008 which is further described in FIG. 12. Proceeding to step 1204, the database manager creates the sub-data space 608a–608q as previously described and sets the data space identifier value used to address that sub-data space 608a–608q. Continuing to step 1206, the database manager allocates and initializes the segment_valid bit map 902. Processing continues to steps 1208 and 1210 which are described in detail below. Processing then returns from step 1008 and continues to step 1010; and Step 4. In step 1010, if the segment 616a–616p containing the page is not mapped, then proceed to step 1012. In step 1012, map the segment 616a–616p and continue to step 1014 to turn "ON" the bit to indicate that the segment 616a–616p was mapped.

This procedure is summarized in the pseudocode shown in Table 2.

In the pseudocode in Table 2, Starting_page_number 602 is an array of as many elements as the number of data objects in the database. The symbol (/) represents the division function. The symbol (//) represents the remainder of a division. The symbol (*) represents the multiplication operator. The symbol (z) is the number of pages in a segment 616a–616p. The symbol (y) is the size of a page in bytes. The symbol (m) is the referenced page from the start of the data object. The symbol (n) is the identity of the data object. The symbol (x) is the number of pages in one sub-data space 608–608q.

Checking the "segment valid" bit at each page request is inexpensive because the segment_valid bit map 902 is small. If the segment 616a–616p is not mapped, then the database manager program reads the directory 1 blocks containing information on the pages required for that segment 616a–616p and issues a request to map the segment 616a–616p data space pages that contain the referenced pages to page locations on disk 2. Once mapped, the "segment valid bit" is turned "ON" and any subsequent reference to read a page in that segment 616a–616p is translated directly to a virtual storage address without reference to the database directory 1. The net result is an improved query response time.

If a request is made for an update (the page was modified), the page may have to be shadowed (moved to a new disk 2 location). Alternatively, it may have to be inserted if it had not existed before (i.e. first insert). This requires a change to the mapping in which case the database manager determines from the database directory 1 if the page needs to be (re)mapped.

Figure 13:
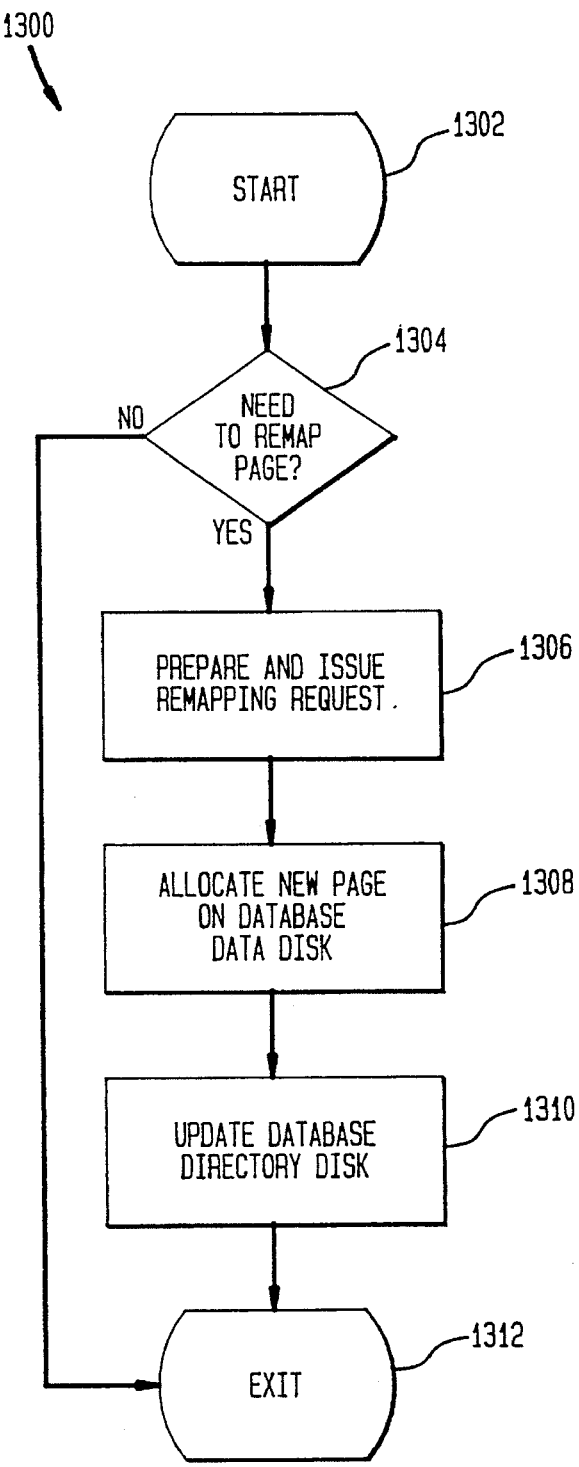
FIG. 13 is a control flow diagram illustrating the remapping of a data page.

Remapping a page is illustrated in FIG. 13. Beginning at step 1304, the database manager determines whether a page needs to be remapped. If so, the database manager continues to step 1306 to prepare and issue a remapping request. Continuing to step 1308, a new data page is allocated. Continuing to step 1310, the directory 1 is updated and a new mapping is done. This results in a mapping change, not a change in the virtual address of a page.

Figure 14:
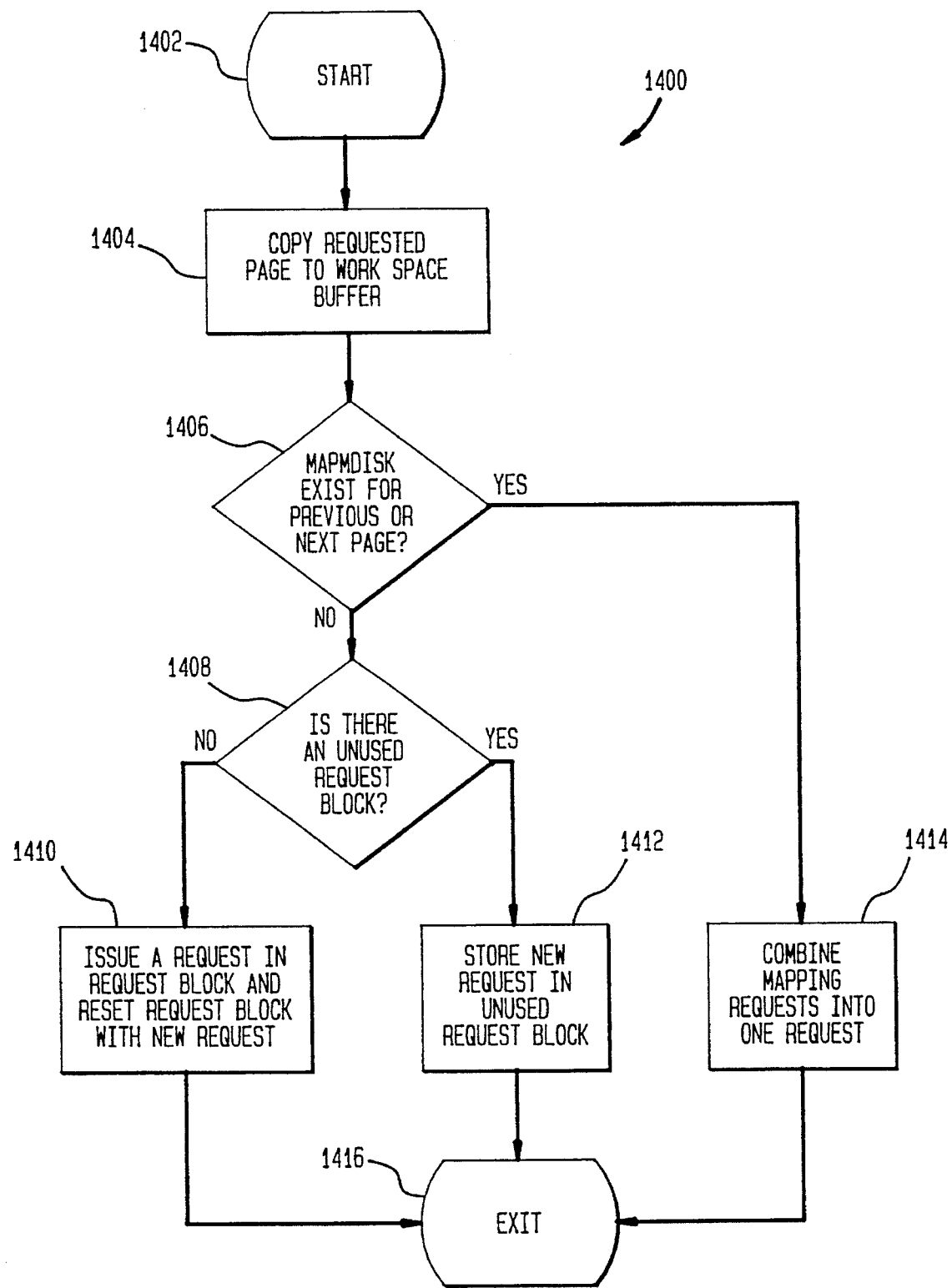
FIG. 14 is a control flow diagram illustrating the modification of a data page and the remapping of the data page using MAPMDISK.

An example of mapping on demand, as provided by one aspect of the present invention, is illustrated in FIG. 14 and is described using the IBM SQL/DS database management system operating on an IBM System/390 computer with the IBM VM/ESA operating system. Before updating a page, the IBM SQL/DS management system begins at step 1404 and copies the requested page to a buffer. It then reissues the MAPMDISK DEFINE request with the PAGEVIEW=ZERO parameter before copying the data back from the local buffer to the data space 608a–608q. Note, PAGEVIEW=ZERO informs the VM/ESA operating system that it should provide an empty real storage page for that data space 608a–608q page rather than reading the contents of the disk 2 when the page is first referenced.

If updating without the use of a local buffer is desired, the page can be remapped with the PAGEVIEW=RETAIN parameter. This first reads the copy of the page from its current disk 2 (old) location before resetting the mapping to the new location. Consequently, the user is presented with the old copy of the page which will be written to the new location.

When the local buffer is used, the remapping is deferred to when the page is moved back from the local buffer to the data space 608a–608q. Performance optimization is implemented by delaying the remapping in an attempt to group multiple mapping requests into one MAPMDISK DEFINE call.

For this purpose, several MAPMDISK DEFINE request blocks are initialized and used as required. Each request is batched for several consecutive data space pages.

When a page is moved to the local buffer, step 1404, and a MAPMDISK DEFINE is required, the following is done for a new request:

i) Continuing from step 1404 to step 1406, the IBM SQL/DS management system determines if a MAPMDISK DEFINE request exists for the previous or the next page of the same data space 608a–608q. If one exists, processing continues to step 1414 in which the two requests are combined into one;

ii) If the new request cannot be attached to any existing request so that it would be consecutive, processing continues to step 1408. In step 1408, if an unused request block exists, processing proceeds to step 1412 in which the unused request block is used to store the new request; and iii) If step 1408 determines that all of the pre-allocated request areas are in use, processing continues to step 1410 in which the IBM management system issues the DEFINE for the requests already in one of the request control blocks and resets that block for the current page.

Since, by using an embodiment of the present invention, the operating system is now responsible for performing the database I/O operations through its paging mechanism, an interface is used to ensure that all modified data is written to the database at regular intervals, thereby maintaining integrity of the database.

In the prior art, mechanisms exist to request that changes to a database be written to disk 2 while the database manager is waiting. However, such mechanisms cause significant delays at a checkpoint time because many pages may be needed to be written to disk 2. To resolve this problem, some operating systems have implemented a mechanism whereby the database manager specifies a subset of the database to be made current on disk 2 (i.e. to be written to disk 2 if the pages in memory were modified). Further, the mechanism is said to be asynchronous in that a save request is issued, and processing continued, while the I/O operations are performed. An indicator is presented to the database manager when all I/O operations needed for that SAVE have completed.

One embodiment of the present invention takes advantage of the above mechanism to implement a partial save. Like mapping on demand which allows the database manager to delay the mapping to the first reference of a page, the invention provides for a partial save which allows the database manager to request page saves at short intervals and for only the modified pages of a data object.

Figure 15:
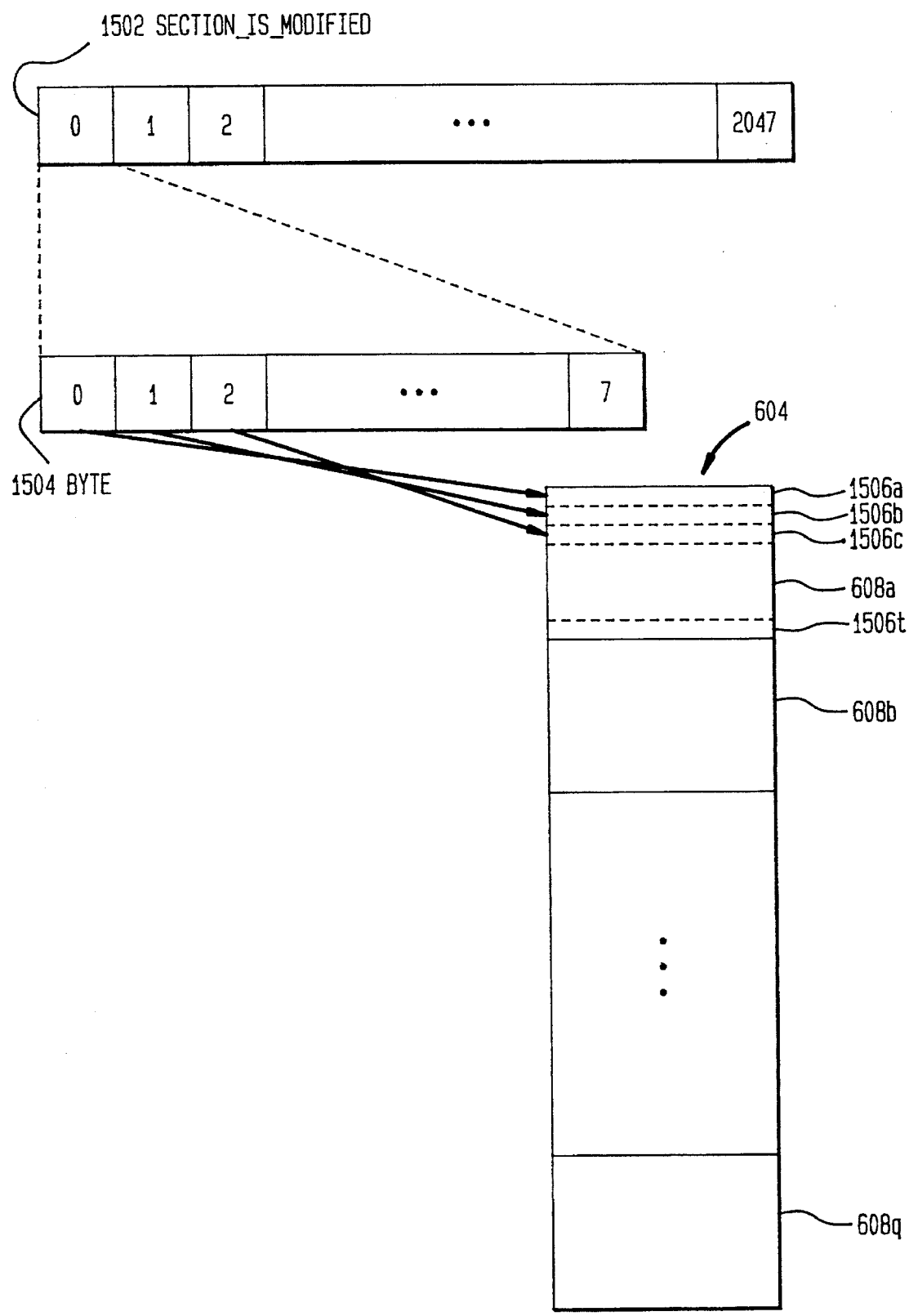
FIG. 15 is a block diagram illustrating the structure of a section_is_modified bit map.
Figure 16:
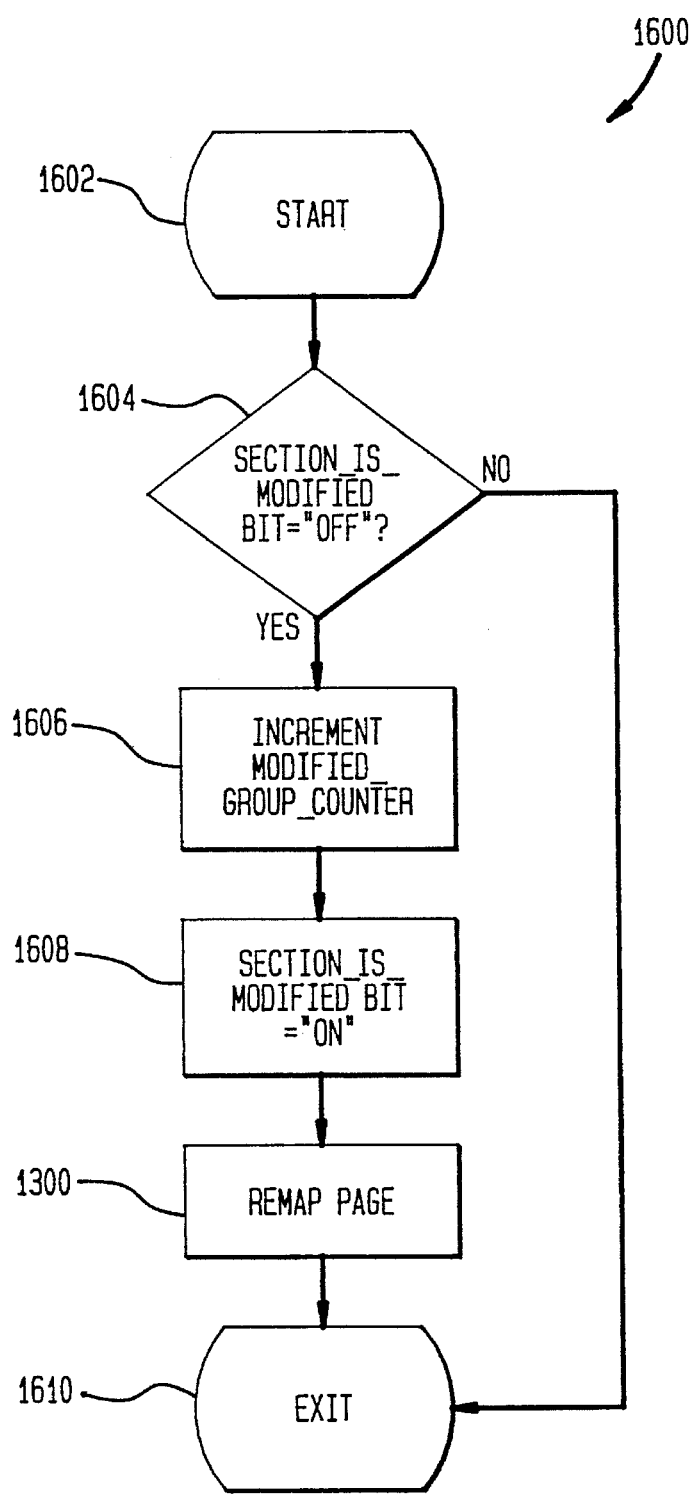
FIG. 16 is a control flow diagram illustrating the modification of a data page.
Figure 17:
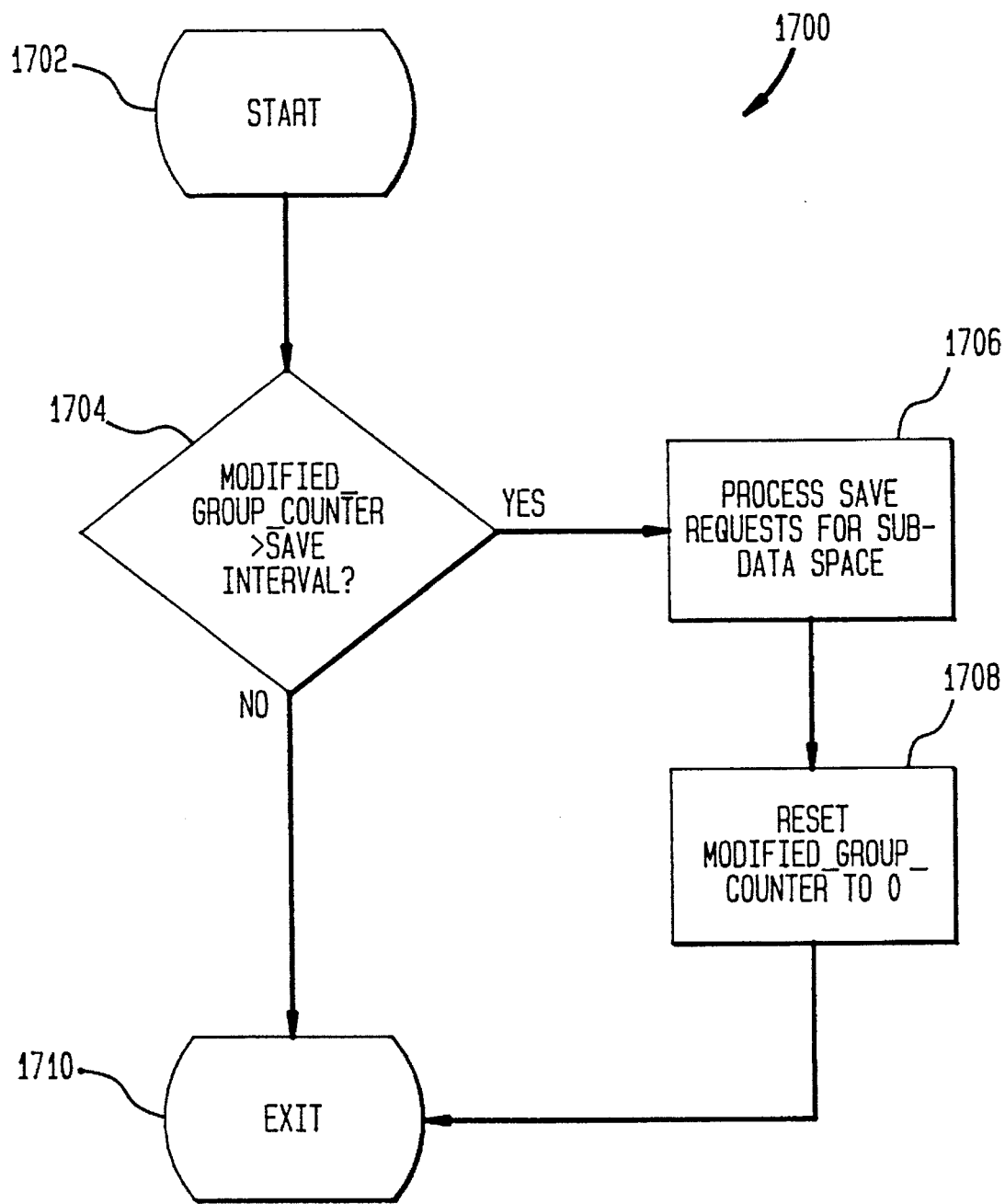
FIG. 17 is a control flow diagram illustrating the saving of modified pages in a simulated contiguous data space at a save interval.

Partial save is illustrated in FIGS. 15–17 and can be described using the IBM SQL/DS database management system as follows:

Like the segment_valid bit map 902, a section_is_modified bit map 1502 is allocated and set to '0' when a data space 608a–608q is referenced for the first time. See step 1208 in FIG. 12. In this case, the section_is_modified bit map 1502 comprises 1 bit for every 32 pages (or 2048 bytes per data space 608a–608q). The bit representing a set of 32 pages is calculated by dividing the page address by 131,072 (32 pages of 4096 bytes each). Before moving a page from the local buffer back to the data space 608a–608q, the corresponding bit in the section_is_modified bit map 1502 is checked. See step 1604 in FIG. 16. If it is "OFF" (0), processing proceeds to steps 1606 and 1608 in which the bit is then turned "ON" (1) and a counter is incremented to keep track of the number of bits currently "ON".

In step 1704, when the counter reaches a predefined limit (set by the user) the database manager proceeds to step 1706 and issues a MAPMDISK SAVE using as the list of addresses to save, the list corresponding to the pages represented by the "ON" bits in the section_is_modified bit map 1502. Step 1706 is described in more detail below. The database manager then continues to step 1708 and resets the counter to 0. Since the request is asynchronous, the database manager continues processing while the I/O operations take place. The value of the counter determines the frequency with which the partial saves are issued (a lower counter causes more frequent partial saves). The counter also determines the maximum number of outstanding page sets for which the SAVE has been issued to save all the database pages on disk 2.

Figure 18:
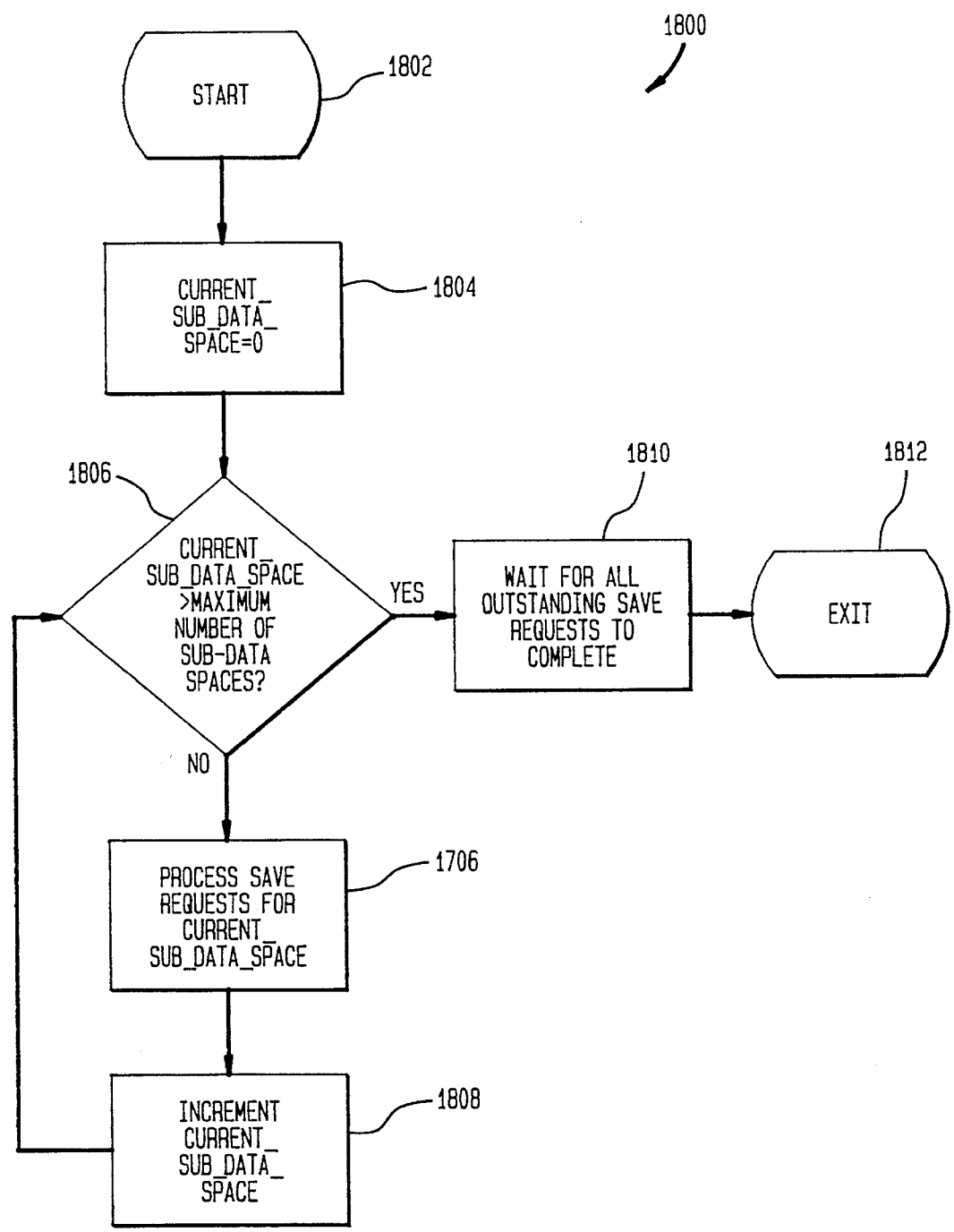
FIG. 18 is a control flow diagram illustrating the saving of modified pages in a simulated contiguous data space at a checkpoint.
Figure 19:
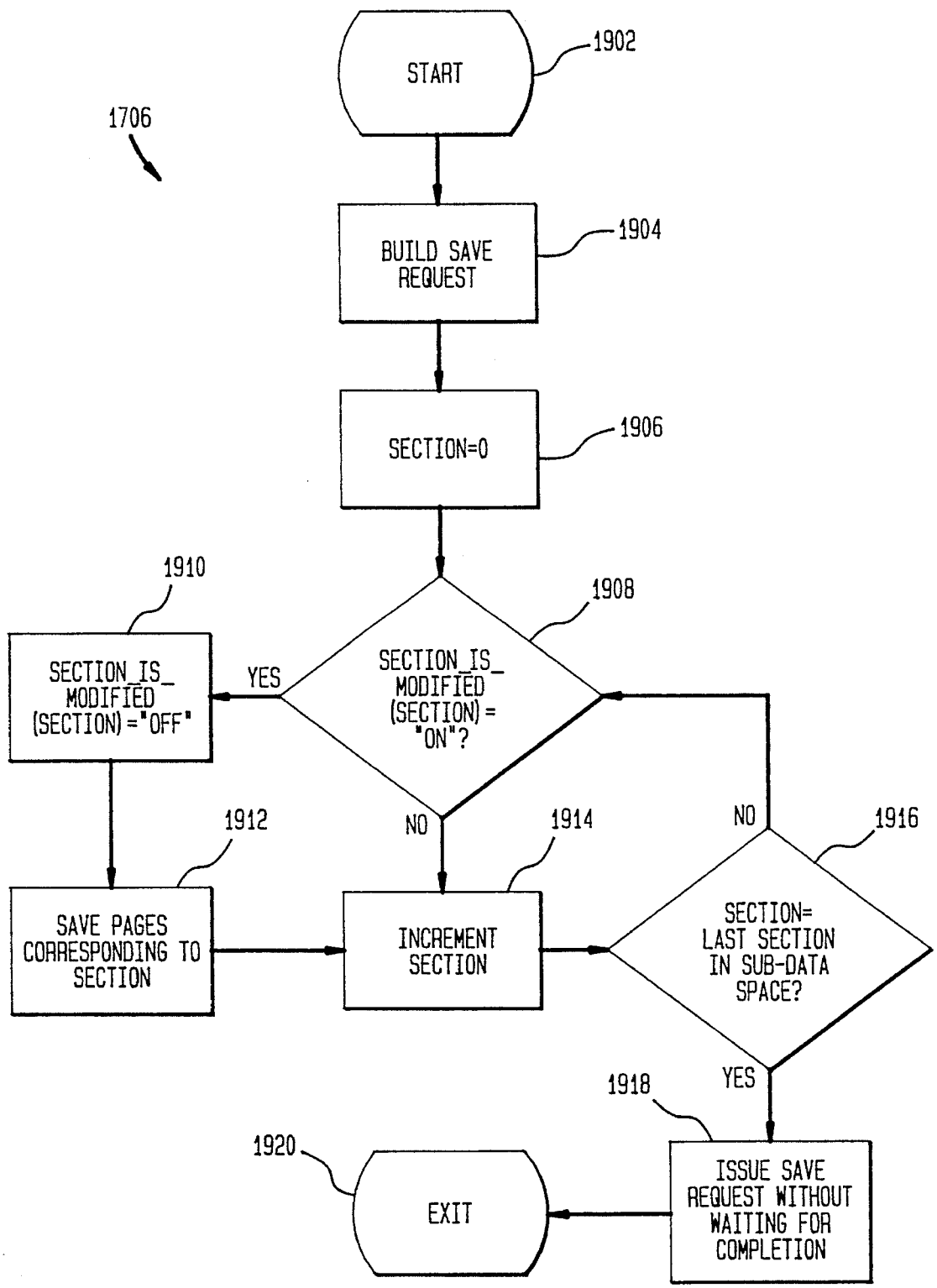
FIG. 19 is a control flow diagram illustrating the process for saving write requests for a sub-data space.

The steps comprising the partial save are summarized as follows:

Step 1. When a data space 608a–608q is created, allocate a section_is_modified bit map 1502 made of 1 bit per 'n' pages of data spaces 608a–608q and initialize the bit map 1502 to '0'. See step 1208 in FIG. 12. Initialize a counter (Modified_group_count) for that data space 608a–608q to 0. See step 1210 in FIG. 12;

Step 2. When modifying a page in the data space 608a–608q, execute step 1604 to check the corresponding bit in the section_is_modified bit map 1502. If the bit is "OFF" (0), continue to step 1606 and increment the Modified_group_count for that data space. Continuing to step 1608, change the bit to "ON" (1);

Step 3. Executing step 1704 as illustrated in FIG. 17, if the Modified_group_count reaches a save interval threshold proceed to step 1706. In step 1706, as illustrated in FIG. 19, execute steps 1904–1916 to build a save request comprising all of the pages corresponding to the "ON" (1) bits in the section_is_modified bit map 1502 for that data space 608a–608q. Continuing in FIG. 19, in step 1918, issue the SAVE request as an asynchronous request; and Step 4. At a checkpoint time, as illustrated in FIG. 18, build a save request, step 1706, for each data space 608a–608q of the pages corresponding to the "ON" (1) bits in the section_is_modified bit map 1502 of the data space 608a–608q. See steps 1804–1808 in FIG. 18. In step 1706, as illustrated in FIG. 19, reset the section_is_modified bit map 1502 to "OFF" (0), and issue the save request. Referring again to FIG. 18, continue to step 1810 and wait for all the save requests to complete before marking the checkpoint as completed.

The data space 608a–608q creation procedure of the present invention is represented in pseudocode as shown in Table 3.

In the pseudocode in Table 3, (*) is the multiplication operator. The symbol (x) is the number of pages in one data space. The symbol (y) is the number of bytes per page. The symbol (m) is the size in pages of the data object. The symbol (n) is the number of pages represented by 1 bit. The symbol (i) is a counter.

For each SAVE request issued, the database manager keeps the control block which was built to issue the request until the request completes. On completion, if the operating system indicates that some of the I/O operations were not completed, due to a hardware problem, the database manager takes corrective action.

No restrictions are placed on pages that are referenced in a MAPMDISK SAVE request. Therefore, the pages are modified after the request is issued even before the SAVE completion are received. No assumption is made on what version of the page was written out. The system saves the latest copy at a later time.

With this invention, the database manager I/O function is bypassed. Furthermore, page I/O operations are implemented so that the operating system informs the database manager that a paging I/O operation is needed (and informs it when it is completed), thereby allowing the database manager to perform other tasks in parallel with the I/O operation. This technique results in very significant improvements in database response times without compromising data integrity.

TABLE 1

If the Starting_page_number of the data object (n), is
greater or equal to 0 (i.e., the data object was placed in
the simulated contiguous data space, then
do;
    Data_space_number = [(Starting_page_number of data
        object, (n)) + m] / [the size of
        1 data space expressed in pages]
Similarly the page address within the sub-data space of the
data object can be determined as follows:
    Page address = [(Starting_page_number of data object
        (n)) + m] // [(The size of 1 data
        space expressed in pages) * (the size
        of 1 page expressed in bytes)]
end;

TABLE 2

If Starting_page_number for data object(n) is not assigned
then do;
    Starting_page_number(n) = Next_available_page;
    Reserved_space = ((Data_object_size(n)/(z) + 1) * (z);
        Next_available_page = Next_available_page +
          Reserved_space;
end;
do;
    Data_space_number = (Starting_page_number(n) + m)/x;
    Page-address = ((Starting_page_number(n) + m)//x) * y;
end;
If Data_space_pointer(Data_space_number) was not created
then
do;
    Create the data space
    Set Data_space_pointer(Data_space_number) to the value
        used to address that data space.
    Allocate the segment valid bit map for that data space
        and initialize it to off.
end;
If Segment_valid(Page_address / y*z) is off then do;
    Map the segment containing Page-m
    Set segment_valid(Page_address / y*z) on;
end;

TABLE 3

```
If Data_space_pointer(Data_space_number) = 0 (this data
        space does not already exist) then
do;
    Create the data space
    Set Data_space_pointer(Data_space_number) to the
        sub-data space pointer value used to
        address that data space.
    Allocate the segment valid bit map for that data
        space and initialize it to off.
    Allocate the section_is_modified bit map for that
        data space of size(m/n) and
        initialize it to off.
    Set Modified_group_count(Data_space_number) to 0.
end;
Similarly the page modification procedure can be
represented in pseudocode as shown as follows:
Modify the page.
If Modified_group_count(Data_space_number) > Save_interval
    and Section_is modified(page-address/(n*y)) is on then
do;
    Initialize a save request
    Do i = 0 to (x/n) − 1
        If section_is_modified(i) is on then
            Add pages from (i*n) to ((i*n)+n) to the
                save request
        end;
    Reset Section_is_modified to off
    Issue the save request without waiting for
        completion
end;
If Section_is_modified(page-address/(n*y) is off then
do;  /* none of the pages in this section were
        modified */
    Increment modified_group_count(Data_space_number) by
        1.
    Set Section_is_modified(page-address/(n*y) on.
end;
Similarly the checkpoint procedure can be represented in
pseudocode as shown as follows:
Do j = 1 to max(Data_space_number)
    Initialize a save request
    Do i = 0 to (x/n) − 1
        If section_is_modified(i) for data space(j) is on
            Add pages from (i*n) to ((i*n)+n) to the
                save request
        End;
    Reset Section_is_modified for data space(j) to off
    Issue the save request without wait for completion
End;
Wait for all outstanding save requests to complete.
```

While the invention has been particularly shown and described with reference to a preferred embodiment thereof, it will be understood by those skilled in the art that various other changes in the form and details may be made therein without departing from the spirit and scope of the invention. For example, the various tables mentioned herein may actually be structured as described or may be split into multiple tables to provide for normality of data. Accordingly, the method and system herein disclosed are to be considered merely as illustrative and the invention is to be limited only as specified in the claims.

What is claimed is:

1. A method for mapping on demand a page of a data object contained in a database and stored in one or more database storage disks, wherein the database comprises one or more database data objects, wherein the database is accessed via a contiguous data space representation, the contiguous data space being represented by a plurality of concatenated sub-data spaces, wherein each sub-data space is a virtual data space of a maximum size that is addressable by a computer operating system, each sub-data space comprising a plurality of data segments, each data segment comprising a plurality of pages, wherein the pages in the contiguous data space representation are contiguous, each page comprising a known number of addressable storage locations, wherein the contiguous data space, the sub-data spaces, the data segments, and the pages are addressable by a database management system, wherein the address of a page to be mapped has been determined to be placed in a data segment of a sub-data space, the method comprising the steps of:

(1) determining whether the sub-data space has been created for representation in the contiguous data space;

(2) creating the sub-data space for representation in the contiguous data space if step (1) determines that the sub-data space has not been created in the contiguous data space;

(3) creating a segment bit map for the sub-data space if step (1) determines that the sub-data space has not been created in the contiguous data space, wherein said segment bit map comprises a plurality of bits, each bit representing a data segment contained in the sub-data space and indicating whether said data segment has been mapped to the database storage disk;

(4) determining if a bit in said segment bit map is equal to a predetermined value, wherein said bit corresponds to the data segment of the sub-data space containing the page to be mapped, and said predetermined value indicates that the data segment corresponding to said bit has been mapped to the database storage disk;

(5) mapping a data segment of the data object from the database storage disk to the data segment of the sub-data space, wherein said data segment from the database storage disk contains the page to be mapped, and said mapping occurs if step (4) determines that said bit in said segment bit map does not equal said predetermined value; and (6) setting said bit in said segment bit map to said predetermined value, wherein said setting occurs when step (5) is performed.

2. The method of claim 1, wherein the page to be mapped is to be modified, thereby creating a page to be modified, comprising the further steps of:

(7) determining whether said page to be modified requires a new mapping to the database storage disk;

wherein if step (7) determines that said page to be modified requires said new mapping to the database storage disk, the method comprise the further steps of:

(8) copying said page to be modified to another work space in computer memory and modifying said page to be modified in said another work space in computer memory;

(9) allocating a new database storage page in said database storage disk;

(10) determining whether a mapping request to map said page to be modified to said new database storage page in said database storage disk can be combined with a prior mapping request, wherein said prior mapping request maps a second page in the sub-data space to a second database storage page in said database storage disk and said page to be modified is adjacent to said second page in the sub-data space;

(11) issuing said prior mapping request if step (10) determines that said prior mapping request cannot be combined with said prior mapping request and said prior mapping request exists;

(12) copying said second page of said prior mapping request from said another work space in computer memory if step (11) issues said prior mapping request;

(13) preparing said mapping request if step (11) issues said prior mapping request or said prior mapping request does not exist; and

(14) combining said mapping request with said prior mapping request if step (10) determines that said mapping request can be combined with said prior mapping request.

3. A computer system for mapping on demand a page of a data object contained in a database and stored in one or more database storage disks, wherein the database comprises one or more database data objects, wherein the database is accessed via a contiguous data space representation, the contiguous data space being represented by a plurality of concatenated sub-data spaces, wherein each sub-data space is a virtual data space of a maximum size that is addressable by a computer operating system, each sub-data space comprising a plurality of data segments, each data segment comprising a plurality of pages, wherein the pages in the contiguous data space representation are contiguous, each page comprising a known number of addressable storage locations, wherein the contiguous data space, the sub-data spaces, the data segments, and the pages are addressable by a database management system, wherein a page to be mapped has been determined to be placed in a data segment of a sub-data space, comprising:

first determining means for determining whether the sub-data space has been created for representation in the contiguous data space;

sub-data space means for creating the sub-data space for representation in the contiguous data space if said first determining means determines that the sub-data space has not been created in the contiguous data space;

bit map means for creating a segment bit map for the sub-data space if said first determining means determines that the sub-data space has not been created in the contiguous data space, wherein said segment bit map comprises a plurality of bits, each bit representing a data segment contained in the sub-data space and indicating whether said data segment has been mapped to the database storage disk;

second determining means for determining if a bit in said segment bit map is equal to a predetermined value, wherein said bit corresponds to the data segment of the sub-data space containing the page to be mapped, and said predetermined value indicates that the data segment corresponding to said bit has been mapped to the database storage disk;

mapping means for mapping a data segment of the data object from the database storage disk to the data segment of the sub-data space, wherein said data segment from the database storage disk contains the page to be mapped, and said mapping occurs if said second determining means determines that said bit in said segment bit map does not equal said predetermined value; and setting means for setting said bit in said segment bit map to said predetermined value, wherein said setting occurs when said mapping means is performed.

4. The computer system according to claim 3, wherein the page to be mapped is to be modified, thereby creating a page to be modified, further comprising:

third determining means for determining whether said page to be modified requires a new mapping to the database storage disk;

wherein if said third determining means determines that said page to be modified requires said new mapping to the database storage disk, the computer system further comprising:

first copying means for copying said page to be modified to another work space in computer memory and modifying said page to be modified in said another work space in computer memory;

allocating means for allocating a new database storage page in said database storage disk;

fourth determining means for determining whether a mapping request to map said page to be modified to said new database storage page in said database storage disk can be combined with a prior mapping request, wherein said prior mapping request maps a second page in the sub-data space to a second database storage page in said database storage disk and said page to be modified is adjacent to said second page in the sub-data space;

issuing means for issuing said prior mapping request if said fourth determining means determines that said mapping request cannot be combined with said prior mapping request and said prior mapping request exists;

second copying means for copying said second page of said prior mapping request from said another work space in computer memory if said issuing means issues said prior mapping request;

preparing means for preparing said mapping request if said issuing means issues said prior mapping request or said prior mapping request does not exist; and combining means for combining said mapping request with said prior mapping request if said fourth determining means determines that said mapping request can be combined with said prior mapping request.

\* \* \* \* \*